United States Patent
Imamura

(10) Patent No.: US 9,471,725 B2
(45) Date of Patent: Oct. 18, 2016

(54) METHOD FOR ESTIMATING NOISE PERFORMANCE OF ROLLING TIRE

(71) Applicant: SUMITOMO RUBBER INDUSTRIES, LTD., Kobe-shi, Hyogo (JP)

(72) Inventor: Ao Imamura, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 633 days.

(21) Appl. No.: 13/938,926

(22) Filed: Jul. 10, 2013

(65) Prior Publication Data

US 2014/0019103 A1 Jan. 16, 2014

(30) Foreign Application Priority Data

Jul. 11, 2012 (JP) .................................. 2012-155804

(51) Int. Cl.
*G06F 17/50* (2006.01)
*B60C 99/00* (2006.01)
*B60C 19/00* (2006.01)

(52) U.S. Cl.
CPC ......... *G06F 17/5009* (2013.01); *B60C 99/006* (2013.04); *B60C 19/002* (2013.04); *G06F 17/5018* (2013.01)

(58) Field of Classification Search
None
See application file for complete search history.

(56) References Cited

U.S. PATENT DOCUMENTS

| | | | | |
|---|---|---|---|---|
| 6,430,993 B1* | 8/2002 | Seta | .......................... | B60C 3/00 73/146 |
| 6,920,417 B2* | 7/2005 | Lescot | ................. | G06F 17/5036 438/510 |
| 8,452,578 B2* | 5/2013 | Shiraishi | ............. | B60C 11/0318 703/7 |
| 9,165,093 B2* | 10/2015 | Imamura | ............... | B60C 99/006 |
| 2002/0134149 A1* | 9/2002 | Shiraishi | ................. | B60C 19/00 73/146 |
| 2002/0177976 A1* | 11/2002 | Shiraishi | ................. | B60C 11/00 702/183 |
| 2003/0055617 A1* | 3/2003 | Iwasaki | ................... | B60C 11/00 703/2 |
| 2004/0107081 A1* | 6/2004 | Miyori | ...................... | B60C 3/00 703/6 |
| 2004/0243340 A1* | 12/2004 | Miyamoto | .......... | B60C 11/0318 702/142 |
| 2007/0073456 A1* | 3/2007 | Kabe | ....................... | B60C 19/00 701/31.4 |
| 2007/0137290 A1* | 6/2007 | Shiraishi | ............. | G06F 17/5018 73/146 |
| 2009/0210206 A1* | 8/2009 | Kwon | ................. | G06F 17/5018 703/9 |
| 2010/0236695 A1* | 9/2010 | Lamontia | ............... | B29D 30/52 156/123 |
| 2010/0299107 A1* | 11/2010 | Umayahara | ............ | G01H 17/00 703/1 |
| 2010/0305746 A1* | 12/2010 | Shiraishi | ............. | B60C 11/0318 700/199 |
| 2012/0060994 A1* | 3/2012 | Hayashi | ............. | B60C 17/0009 152/523 |

FOREIGN PATENT DOCUMENTS

JP 2002-7489 A 1/2002

OTHER PUBLICATIONS

P. Droll and H. D. Kutzbach, "Laserscanner for 3D-measurements of surfaces" pp. 1-2, 2001.*

* cited by examiner

*Primary Examiner* — Kibrom K Gebresilassie
(74) *Attorney, Agent, or Firm* — Birch, Stewart, Kolasch & Birch, LLP

(57) ABSTRACT

A method for simulating a rolling tire and estimating its noise performance is disclosed, wherein a tire model rolling on a rough road surface model is simulated, and coordinates of node points appearing in the outer surface of the rolling tire model are stored as time-series coordinates data. A small gap is formed between a tire outer surface model defined by the time-series coordinates data and a smooth road surface model. Then, a sound field filled with air is defined including the gap, and pressure variations of the air are computed.

4 Claims, 16 Drawing Sheets

METHOD FOR ESTIMATING NOISE PERFORMANCE OF ROLLING TIRE

BACKGROUND OF THE INVENTION

The present invention relates to a computer-implemented method for simulating a rolling tire and estimating noise performance of the tire.

In recent years, in order to estimate tire forces exerted on a rolling tire, a method for simulating a rolling pneumatic tire has been proposed for example as disclosed in Japanese Patent Application Publication No. JP-A-2002-007489. In this method, a finite element model of a pneumatic tire including its internal structure is prepared, and the tire model rolling on a flat road surface model is simulated. The air is not considered in the rolling simulation.

On the other hand, it is strongly required to estimate noise performance of a tire rolling on various road surface, especially, the ISO road surface used as a standard for tire noise test by the use of a computer.

In order to simulate noise sound generated by a rolling tire, it is conceivable to define air surrounding the tire model in the above-mentioned prior-art rolling simulation method. But, it is difficult to perform an aerodynamical simulation for noise sound and a rolling simulation for the tire at the same time, and it is necessarily to develop a dedicated software. Further, it is expected that the computational time and cost are greatly increased along with the increased computational size.

Therefore, there is a demand for a method which can estimate noise performance of a tire without difficulty, if possible, without developing a dedicated software,

SUMMARY OF THE INVENTION

It is therefore, an object of the present invention to provide a computer-implemented method for estimating noise performance of a rolling tire, in which a tire rolling on a rough road surface can be simulated and noise performance of the rolling tire can be estimated without increasing the computational size and cost.

According to the present invention, a computer-implemented method for simulating a rolling tire and estimating noise performance thereof, comprises:

a tire model defining process in which a tire model, which is a finite element model of the tire and which has a tread and grooves therein, is defined in a computer, a rough road surface model defining process in which a rough road surface model, which is a finite element model of a rough road surface, is defined in the computer, a rolling simulation process in which calculations of the tire model, which contacts with the rough road surface model and which is rolling thereon, are performed, a coordinates data obtaining process in which coordinates data on node points appearing in the outer surface of the rolling tire model which data are obtained through the rolling simulation process, are stored in the computer as time-series coordinates data, a sound field defining process in which
a smooth road surface model, which is a finite element
 model of a smooth road surface,
a tire outer surface model, which is the outer surface of the
 tire model defined by said coordinates data obtained, and
a sound field in which airflow is possible and which encompasses at least a ground contacting part of the tire outer surface model and the corresponding part of the smooth road surface model,
are defined in the computer, a noise simulation process in which physical quantities of the sound field are computed, rolling the tire outer surface model by the use of the time-series coordinates data.

The method according to the present invention may further comprise: a process in which at least said ground contacting part of the tire outer surface model is separated from the smooth road surface model by small distance so that a gap is formed between the tire outer surface model and the smooth road surface model, wherein the sound field is also defined in the gap.

The roughness of the rough road surface model is preferably 1 to 5 mm in the depth direction, 1 to 20 mm in the rolling direction of the tire model, and 1 to 20 mm in the lateral direction perpendicular to the rolling direction. It is possible to produce the rough road surface model by shifting node points of a smooth road surface by means of random number generation. Also, it is possible to produce the rough road surface model by shifting node points of a smooth road surface according to data on an actual rough road surface obtained by means of three dimensional scanning.

Therefore, in the method according to the according to the present invention, the rolling simulation process and the noise simulation process are separated from each other.

The rolling simulation process can be performed by the use of a finite element analysis application software.

The noise simulation process can be performed by the use of a fluid analysis application software.

Although these two processes are separated, the rotation and deformation of the tire are incorporated in the noise simulation process, as variations of the sound field, therefore, the noise sound generated from the rolling tire can be accurately simulated.

DESCRIPTION OF THE PREFERRED EMBODIMENTS

Embodiments of the present invention will now be described in detail in conjunction with accompanying drawings.

The method according to the present invention is a computer-implemented method for simulating a rolling tire 2 and estimating noise performance of the tire 2 by the use of a computer 1.

Figure 1:
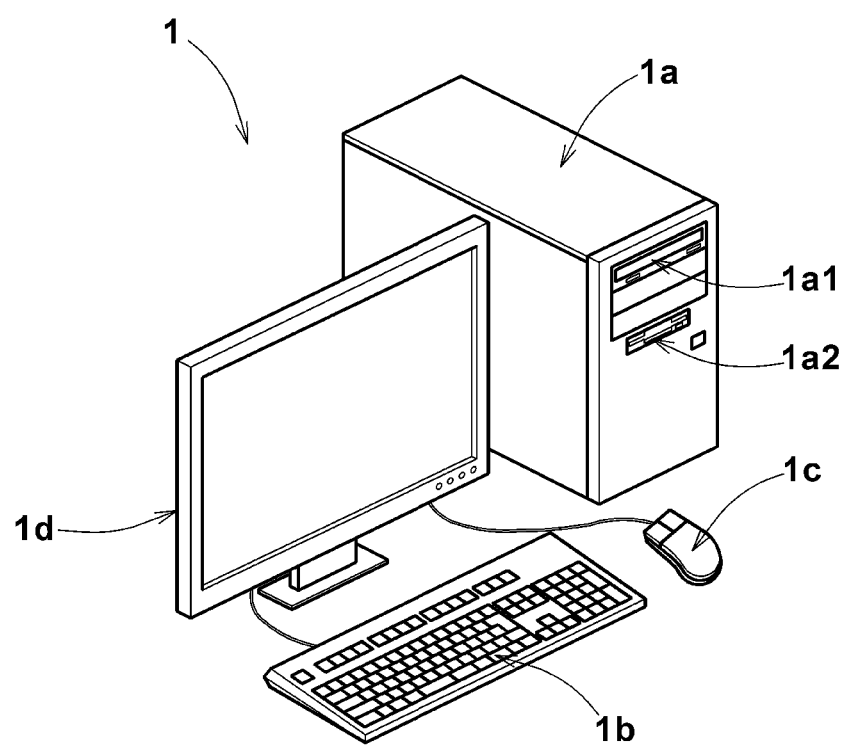
FIG. 1 shows an example of the computer implementing the method according to the present invention.

As shown in FIG. 1 for example, the computer 1 comprises a main body 1a, a keyboard 1b, a mouse 1c and a display 1d. The main body 1a comprises an arithmetic processing unit (CPU), memory, storage devices such as magnetic disk, disk drives 1a1 and 1a2 and the like. In the storage device, programs/software for carrying out the method are stored.

Figure 2:
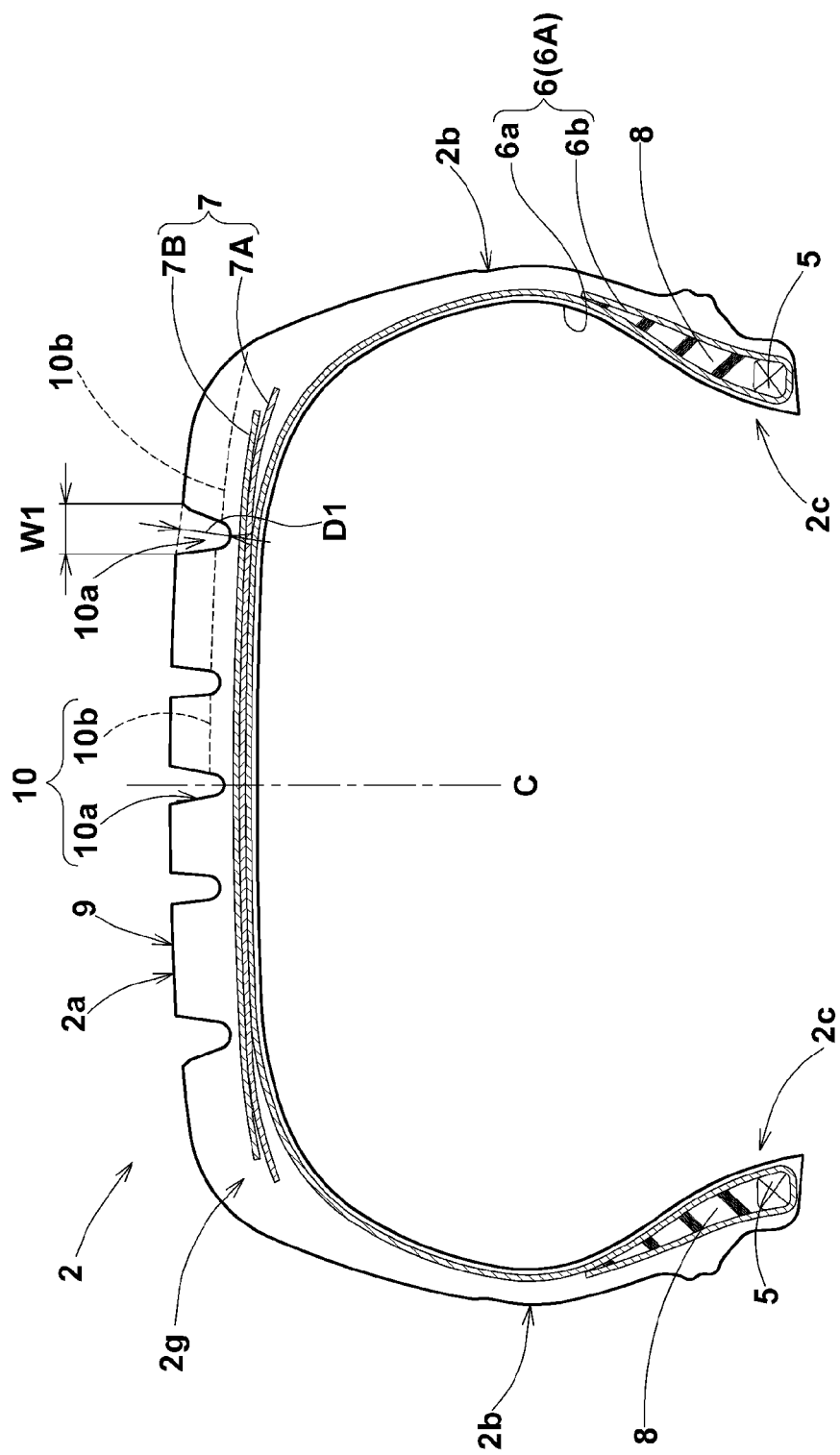
FIG. 2 is a cross sectional view of an example of the tire to be simulated.

As shown in FIG. 2, the tire 2 used in this embodiment is a pneumatic tire. But, the tire 2 to be simulated is not limited to a pneumatic tire. As well known in the tire art, the pneumatic tire comprises a tread portion 2a, a pair of axially spaced bead portions 2c each with a bead core 5 therein, a pair of sidewall portions 2b extending between the tread edges and the bead portions, a carcass 6 extending between the bead portions 2c, and a tread reinforcing belt 7 disposed radially outside the carcass in the tread portion.

The tread portion 2a is provided in its tread or ground contacting face 9 with tread grooves 10 for example having widths W1 of 7 to 12 mm and depths D1 of 8 to 12 mm. The tread grooves 10 may include a longitudinal tread groove 10a extending continuously in the circumferential direction in a straight or zigzag fashion, and lateral tread grooves 10b.

The carcass 6 is composed of at least one ply 6A of cords arranged radially at an angle in the range of from 75 to 90 degrees with respect to the tire equator C, extending between the bead portions 2c through the tread portion 2 and sidewall portions 2b and turned up around the bead core 5 in each bead portion 2c from the axially inside to the axially outside of the tire to form a pair of turnup portions 6b and a main portion 6a therebetween.

The bead portions 2c are each provided between the main portion 6a and turned up portion 6b of the carcass ply with a rubber bead apex 8 extending radially outwardly from the bead core 5.

The belt 7 comprises two cross plies 7A and 7B of parallel cords laid at an angle of 10 to 35 degrees with respect to the tire circumferential direction.

Figure 3:
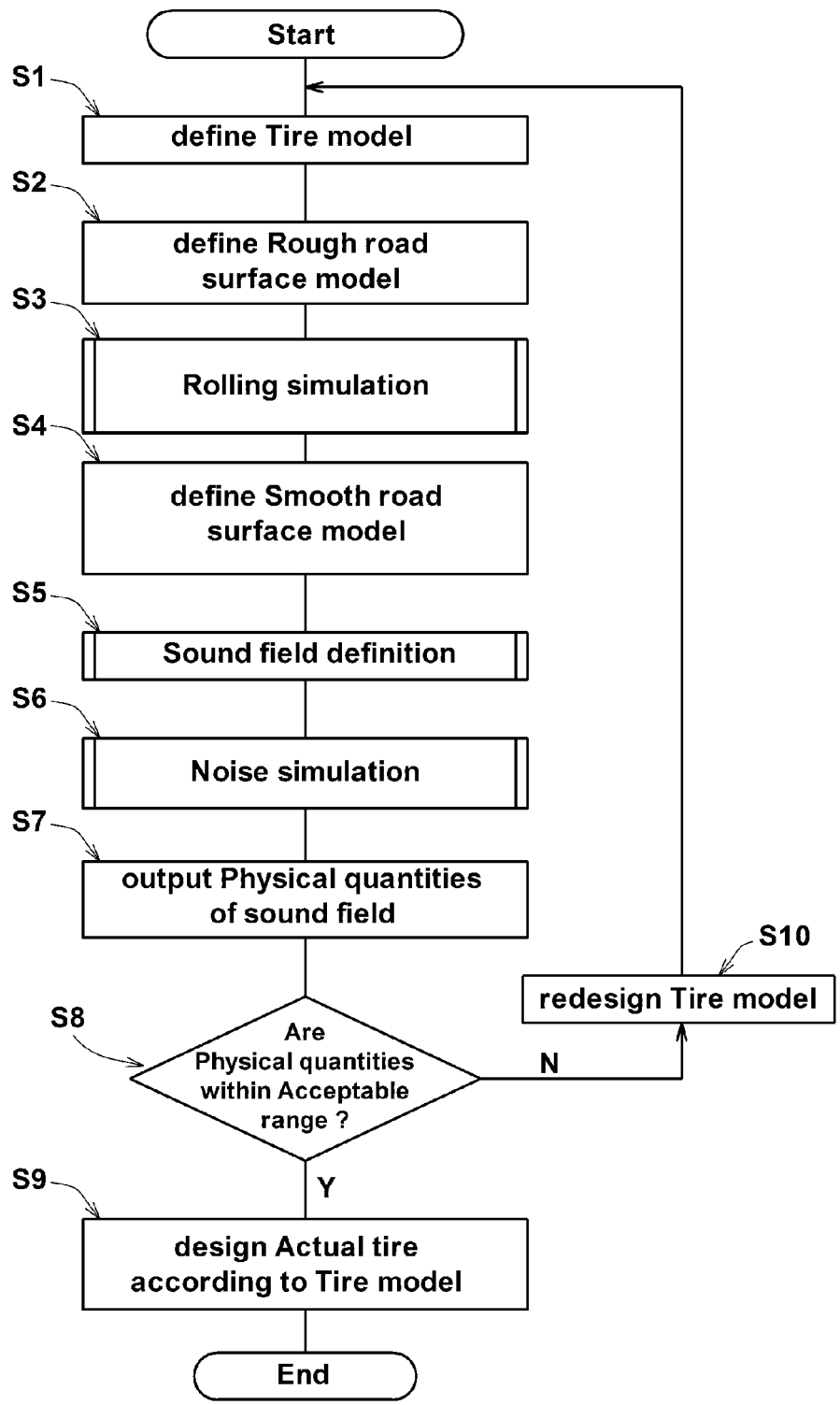
FIG. 3 is a flow chart of an embodiment of the present invention.

FIG. 3 shows a flowchart of the method as an embodiment of the present invention.

*Tire Model Defining Process S1

In this process S1, a tire model 3 of the tire 2 is defined in the computer 1.

Figure 4:
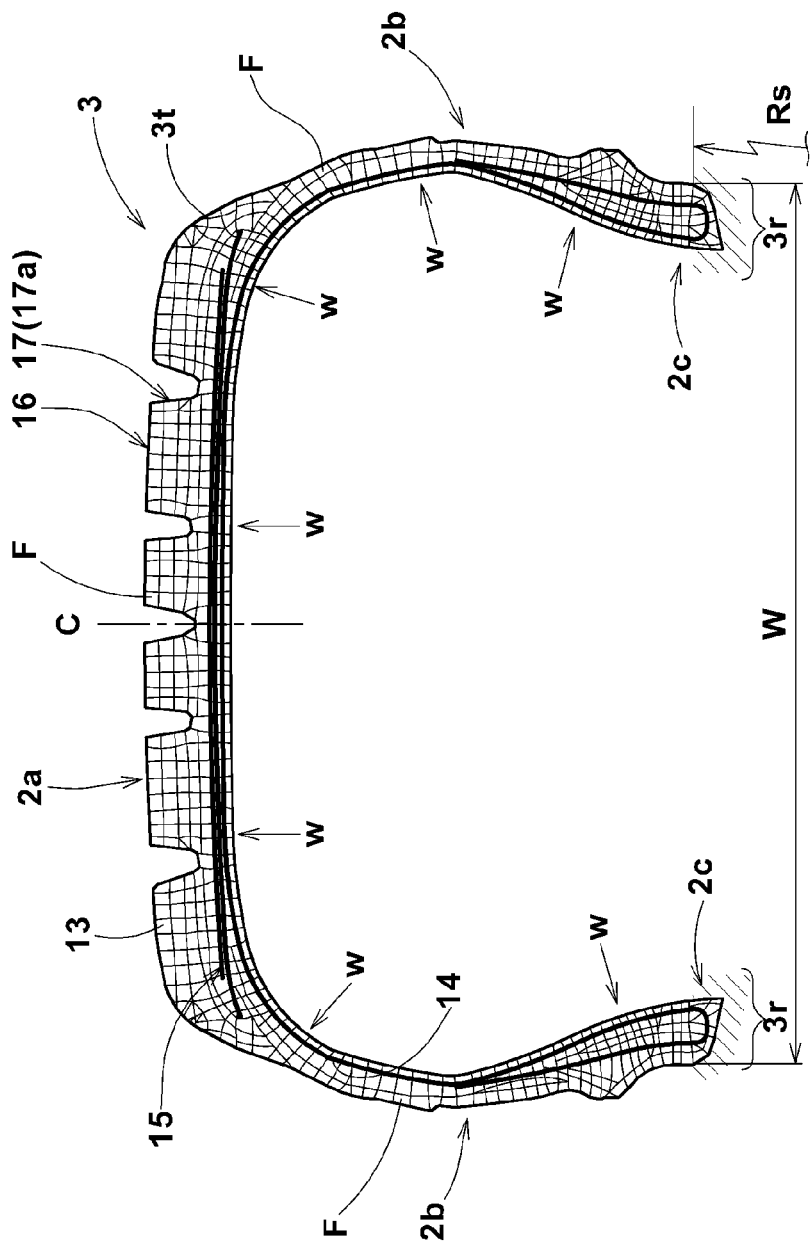
FIG. 4 is a cross sectional view of a tire model corresponding to the tire shown in FIG. 2.

As shown in FIG. 4, the tire model 3 is defined by discretizing the tire 2 into a finite number of elements F processable by a numerical analysis method.

In this embodiment, a finite element method is employed as the numerical analysis method. But, another method such as a finite volume method, difference method, and boundary element method may be employed.

The tire model 3 includes: rubber part models 13 of rubber parts 2g including a tread rubber and the like; a carcass ply model 14 of the carcass ply 6A; and belt ply models 15 of the belt plies 7A and 7B. The tire model 3 has a tread 16 and grooves 17 corresponding to the tread 9 and the grooves 10 shown in FIG. 2. The grooves 17 in this example include longitudinal grooves 17a and lateral grooves 17b corresponding to the longitudinal grooves 10a and the lateral grooves 10b shown in FIG. 2.

As to the elements F of the tire model 3, tetrahedral solid elements are preferably used. In addition, pentahedral solid elements and hexahedral solid elements can be used as well.

Numerical data about the elements F, for example, indexes of the elements, indexes of node points thereof, coordinate values of the node points in the X-Y-Z coordinate system, and material characteristics for example, density, Young's modulus, damping factor and the like of the material represented by each element, are stored in the computer 1.

*Rough Road Surface Model Defining Process S2

In this process S2, a rough road surface model 21 of a rough road surface is defined in the computer 1.

In this embodiment, first, a smooth road surface model 24 is defined. Then, the smooth road surface model 24 is roughened to produce the rough road surface model 21.

The rough road surface in this example is a cylindrical surface of a tire test drum widely used in the tire art. Thus, the smooth road surface model 24 is of a smooth cylindrical surface of the tire test drum.

The smooth road surface model 24 is made up of a finite number of undeformable rigid surface elements G.

Specifically, in a central part 21c of the smooth road surface model 24 on which the tire rolls, some of the node points 22 of the elements G therein are shifted downward (toward radially inside of the drum) and in the longitudinal direction (circumferential direction of the drum) by changing their coordinates.

Numerical data about such rigid surface elements G, for example, indexes of the elements, indexes of node points thereof, coordinate values of the node points in the X-Y-Z coordinate system and the like, are stored in the computer 1.

Thereby, the rough road surface model 21 having a roughened surface 23 is defined.

In order to produce the roughened surface 23, the node points 22 to be shifted and the amount of shift of each node point may be determined randomly within limited ranges preferably to accord with a standard ISO road surface for tire noise test or an asphalt road surface.

Figure 6:
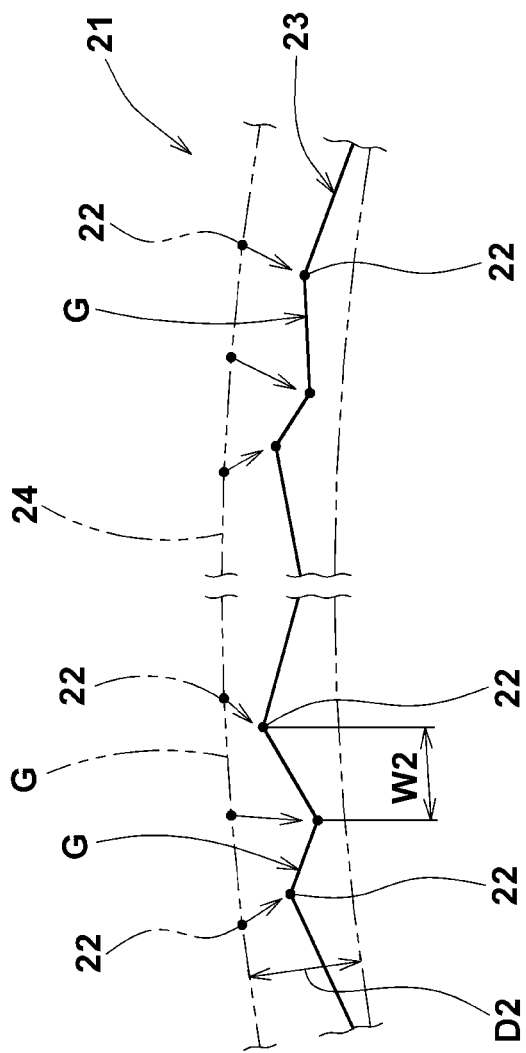
FIG. 6 is a cross sectional view taken along line A-A in FIG. 5.

In this embodiment, as shown in FIG. 6, node points 22 of the smooth road surface model 24 are shifted radially inwardly up to a predetermined radial distance D2 by means of random number generation.

It is however, also possible to determine the node points 22 to be shifted and the amount of shift of each node point according to data on an actual rough road surface (for example, asphalt road surface) obtained by means of three dimensional scanning.

The roughness of the roughened surface 23 measured in the depth direction (corresponding to the above-mentioned distance D2) is set in a range of not less than 1 mm, preferably not less than 2 mm, but not more than 5 mm, preferably not more than 4 mm.

The roughness of the roughened surface 23 measured in horizontal directions (distance W2 in the tire rolling direction shown in FIG. 6, and distance W3 in the lateral direction shown in FIG. 6) is set in a range of not less than 0.1 mm, preferably not less than 1.0 mm, but not more than 20 mm, preferably not more than 5 mm.

*Rolling Simulation Process S3

Figure 5:
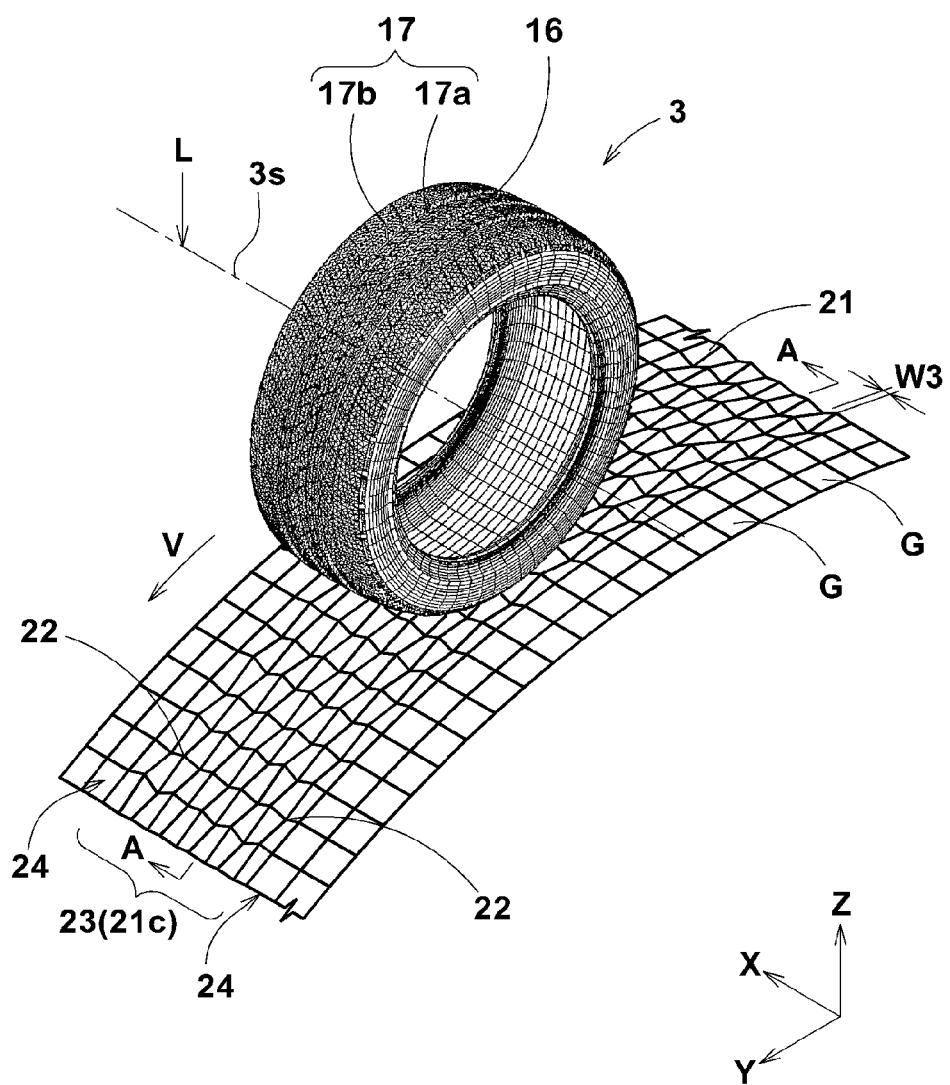
FIG. 5 is a perspective view in which the tire model and rough road surface model are visualized.

In the rolling simulation process S3, with respect to the tire model 3 contacting with the roughened surface 23 as shown in FIG. 5, under predetermined conditions about the traveling velocity v, tire pressure and tire load, calculations of the tire model 3 rolling on the rough road surface model 21 (hereinafter the "rolling calculation") is performed by the computer.

Figure 7:
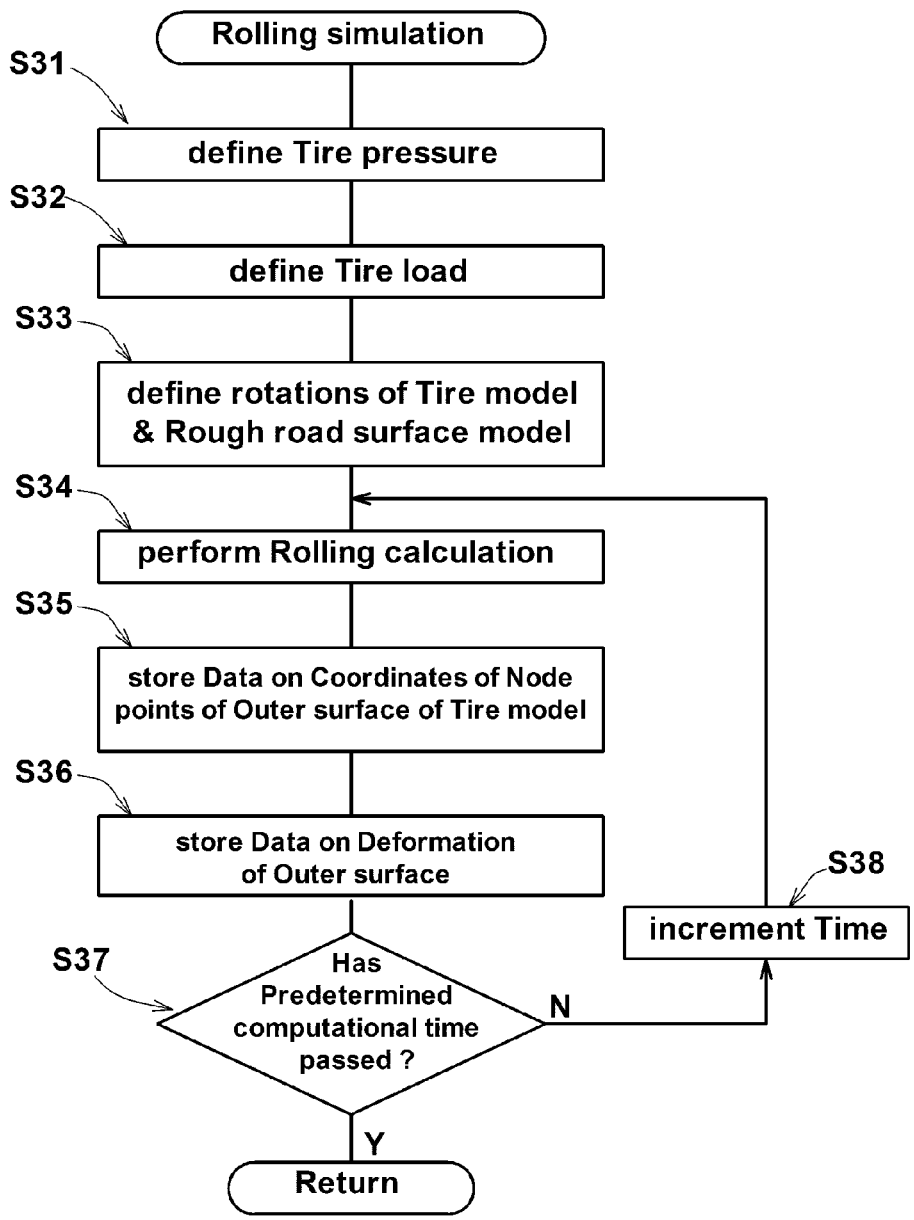
FIG. 7 is a flow chart of the rolling simulation process.

FIG. 7 show a flowchart of the rolling simulation process S3.

**Process S31

In this example, first, a condition of the tire pressure are given to the tire model 3 and a deformation calculation of the tire model 3 is performed.

Specifically, portions 3r and 3r of the tire model 3 contacting with the wheel rim as shown in FIG. 4 are defined as being undeformable and as keeping a constant width w (corresponding to the rim width) between the bead portions 2c of the tire model 3 and also as keeping a constant distance Rs (corresponding to the radius of the wheel rim) between the rim contacting portions 3r and the rotational axis 3s of the tire model 3.

In addition to such conditions, there is defined a condition to apply a distribution load w (corresponding to the tire pressure) to the inner surface of the tire model 3.

Under such conditions, the computer performs an equilibrium calculation about the tire model 3 to obtain displacements of the node points of the tire model 3 due to the application of the tire pressure.

Thus, the inflated tire model 3 inclusive of the rubber part models 13, carcass ply model 14 and belt ply models 15, is defined.

**Process S32

Next, a condition to apply a tire load to the inflated tire model 3 is defined, and a deformation calculation about the inflated tire model 3 is performed.

Specifically, as shown in FIG. 5, a normal tire load L is applied to the rotational axis 3s of the tire model 3 contacting with the roughened surface 23 of the rough road surface model 21.

Thus, the inflated, loaded tire model 3 is defined.

**Process S33

Next, a condition of rolling of the tire model 3 on the rough road surface model 21 is defined.

In this example, as explained above, the road surface model 21 is of a rotatable tire test drum. Therefore, a condition of an angular velocity corresponding to the traveling velocity v is defined on both of the tire model 3 and rough road surface model 21.

**Process S34

Under such rotational conditions, the rolling calculation is performed by the computer 1.

To perform the rolling calculation, mass matrices, rigidity matrices and damping matrices of the respective elements F are defined based on the shapes, material characteristics and the like of the elements. Then, these matrices are combined to produce matrices of the entire system, and a motion equation is produced by applying the various conditions.

In the process S34, the motion equation is calculated at a point of time Tx (x=0, 1, . . . ).

This rolling calculation can be performed by the use of a finite element analysis application software available in the market such as "LS-DYNA" available from Livermore Software Technology Corporation.

**Process S35

The data on the coordinates of the node points appearing in the outer surface 3t of the rolling tire model 3 at the above-mentioned point of time Tx (x=0, 1, . . . ) obtained in the process S34 are stored in computer 1.

Here, the outer surface 3t is the entire outer surface extending between the bead portions 2c through the tread portion 2a and the sidewall portions 2b.

**Process S36

Further, with respect to each of the above-mentioned node points appearing in the outer surface 3t, the difference of its coordinates at the point of time Tx from its coordinates at the previous point of time T(x−1) decremented by one time interval, is calculated and stored in the computer 1.

**Process S37

Next, the computer 1 judges whether or not the predetermined computational time (Tend) has passed from the start point of time T0.

**Process S38

If not yet passed, the point of time Tx is incremented by one time interval (from Tx to Tx+1). Then, the above-mentioned processes S34, S35 and S36 are again performed.

If judged as having passed, the rolling simulation process S3 is terminated.

In the rolling simulation process S3, therefore, the coordinate data and deformation data of the tire model 3 are stored at the fixed time interval from the start to the end of the rolling.

More specifically, the data on the coordinates of the node points appearing in the outer surface 3t of the rolling tire model 3 at points of time Tx (x=0, 1, . . . end) obtained in the process S34 are stored in computer 1 (hereinafter the "time-series coordinate data").

Further, with respect to each of the above-mentioned node points appearing in the outer surface 3t, the difference of its coordinates between two adjacent points of time Tx and Tx+1 (x=0, 1, . . . end) is stored in the computer 1 (hereinafter the "time-series deformation data").

Such time-series deformation data represent vibrations or deformation of the outer surface 3t of the tire model 3 caused by the roughness of the rough road surface during rolling. The time intervals at which the motion equation are calculated or the difference between the points of time Tx (x=0, 1, . . . ) are a fixed value, for example, 1 microseconds.

In the rolling simulation process S3, there is a possibility that the calculation becomes unstable during the initial stage of the rolling simulation due to the increased deformation of the tire model 3.

Such unstable calculation may be avoided by using a smooth road surface, during the initial stage, instead of the roughened surface 23.

In either case, it is preferable to start the acquisition or storing of the time-series coordinate data and deformation data (namely, to start to count the time Tx) after the rolling calculation becomes stable, usually after the tire is rotated at least 180 degrees preferably at least 360 degrees (for example, one or two revolutions).

*Smooth Road Surface Model Defining Process S4

Figure 8:
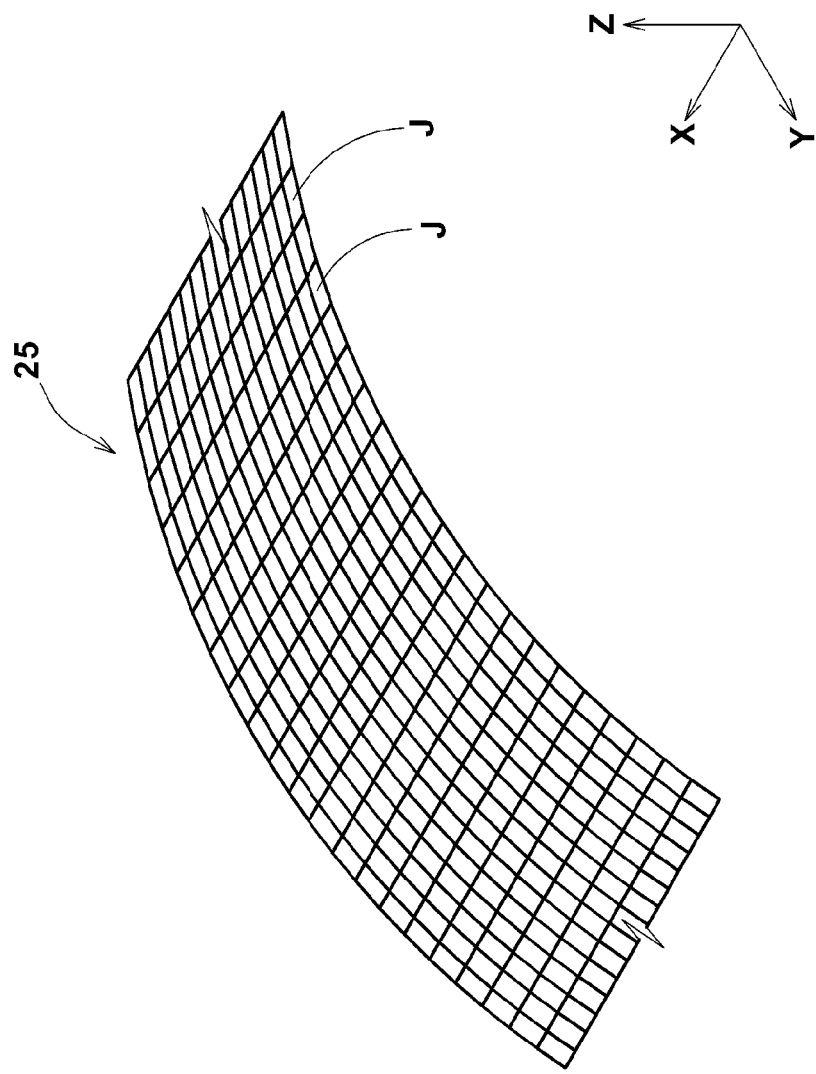
FIG. 8 is a perspective view in which the smooth road surface model is visualized.

Next, as shown in FIG. 8, a smooth road surface model 25 is defined in the computer 1.

The smooth road surface model 25 is the same as the above-mentioned smooth road surface model 24, therefore, the same data can be used.

In the following description, for the sake of convenience, a referential character "J" is used for the elements instead of the referential character "G" here.

Numerical data about the elements J as explained above regarding the elements J are stored in the computer 1.

*Sound Field Defining Process S5

Figure 9:
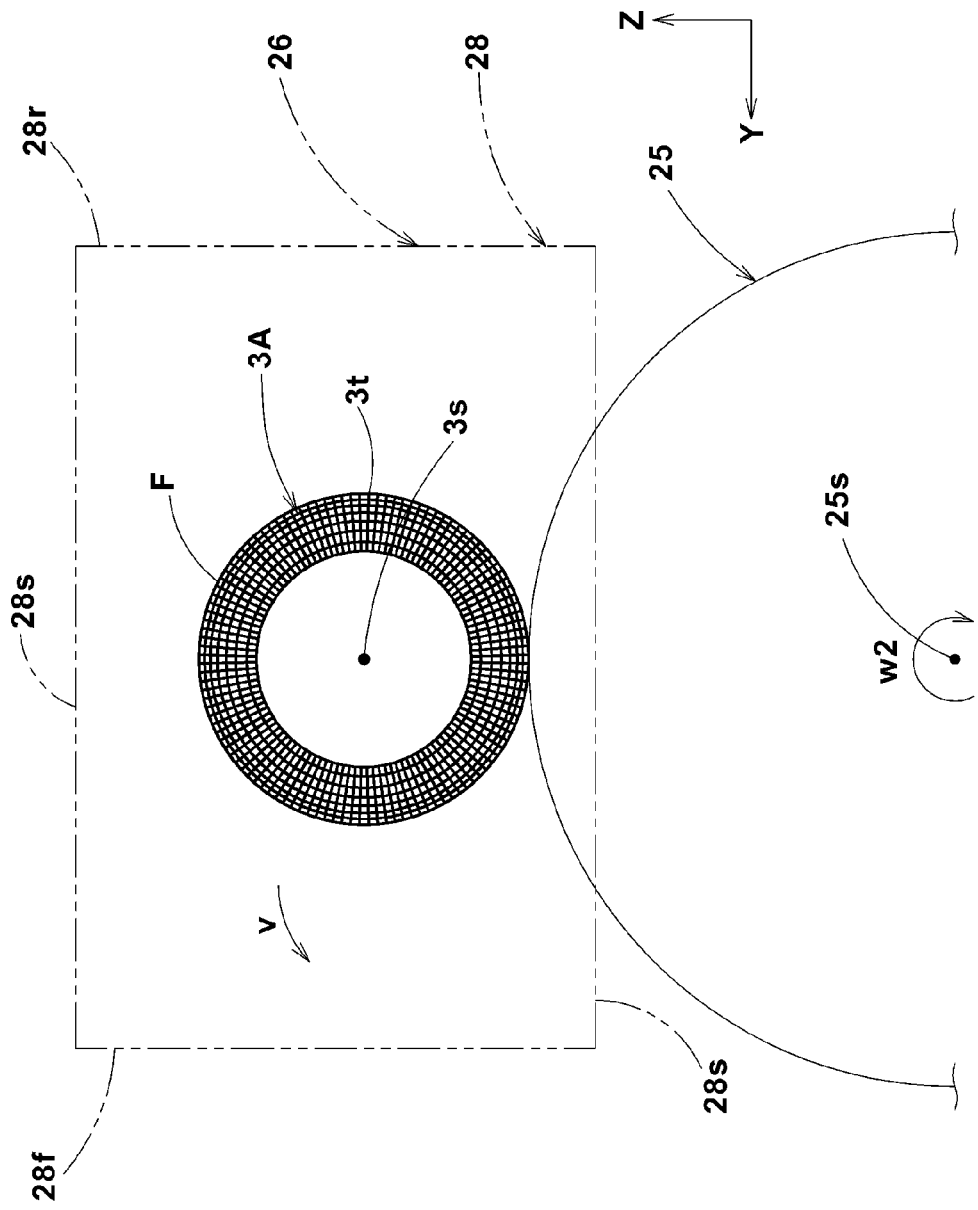
FIG. 9 is a diagram for explaining an example of the sound field.

Next, a sound field 26 in which airflow is possible is defined as shown in FIG. 9.

Figure 10:
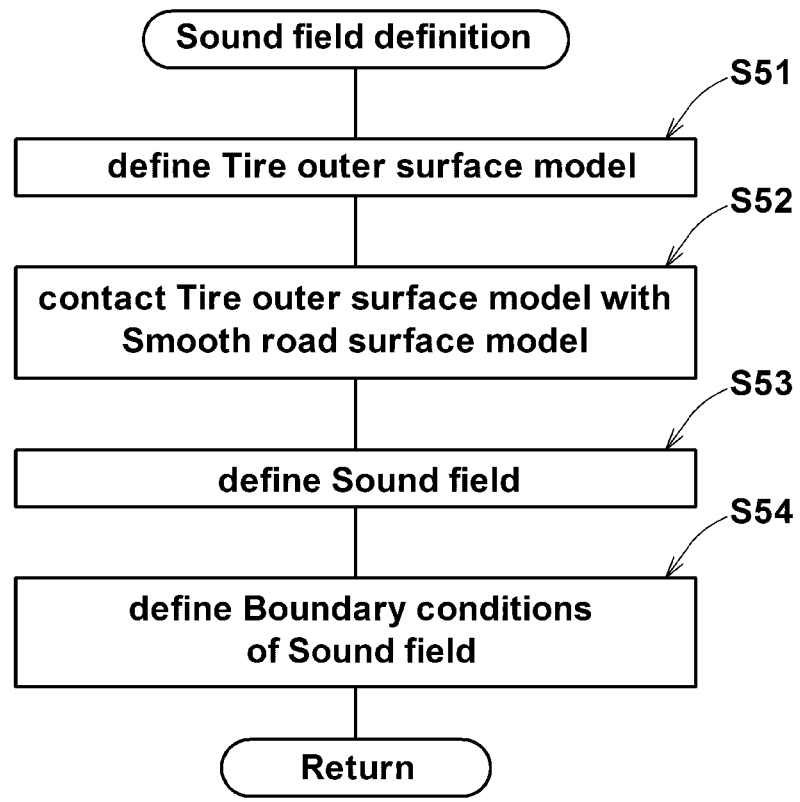
FIG. 10 is a flow chart of the sound field defining process.

FIG. 10 shows a flowchart of this process S5.

**Process S51

In this embodiment, another tire model 3A shown in FIG. 10, which is different from the tire model 3 used in the rolling simulation process S3 as shown in FIG. 5, is defined.

The tire model 3A is defined by the use of the coordinate data obtained as above and relating to the outer surface 3t of the tire model 3 at a certain point of time, for example, T0 when the data acquisition is started.

In other words, the tire model 3A is made up of only the elements F representing the outer surface 3t of the tire model 3, and the elements representing the internal tire structure are omitted in order to reduce the amount of data to be processed. Therefore, if convenient, the tire model 3A will be called the tire outer surface model.

The elements F of the tire outer surface model 3A are provided with the deformation data (process S36) together with the coordinate data (process S36).

**Process S52

Next, the tire model 3A is contacted with the smooth road surface model 25 shown in FIG. 8.

**Process S53

Then the sound field 26 is defined.

The sound field 26 in this example is defined as a rectangular parallelepiped 28, which encompasses at least the mutually contacting parts of the tire model 3A and the smooth road surface model 25, and from which the tire model 3A and the smooth road surface model 25 are extracted.

In the sound field 26, air is defined so that the air is movable by the rotating tire model 3A to generate dilatational waves.

Figure 11:
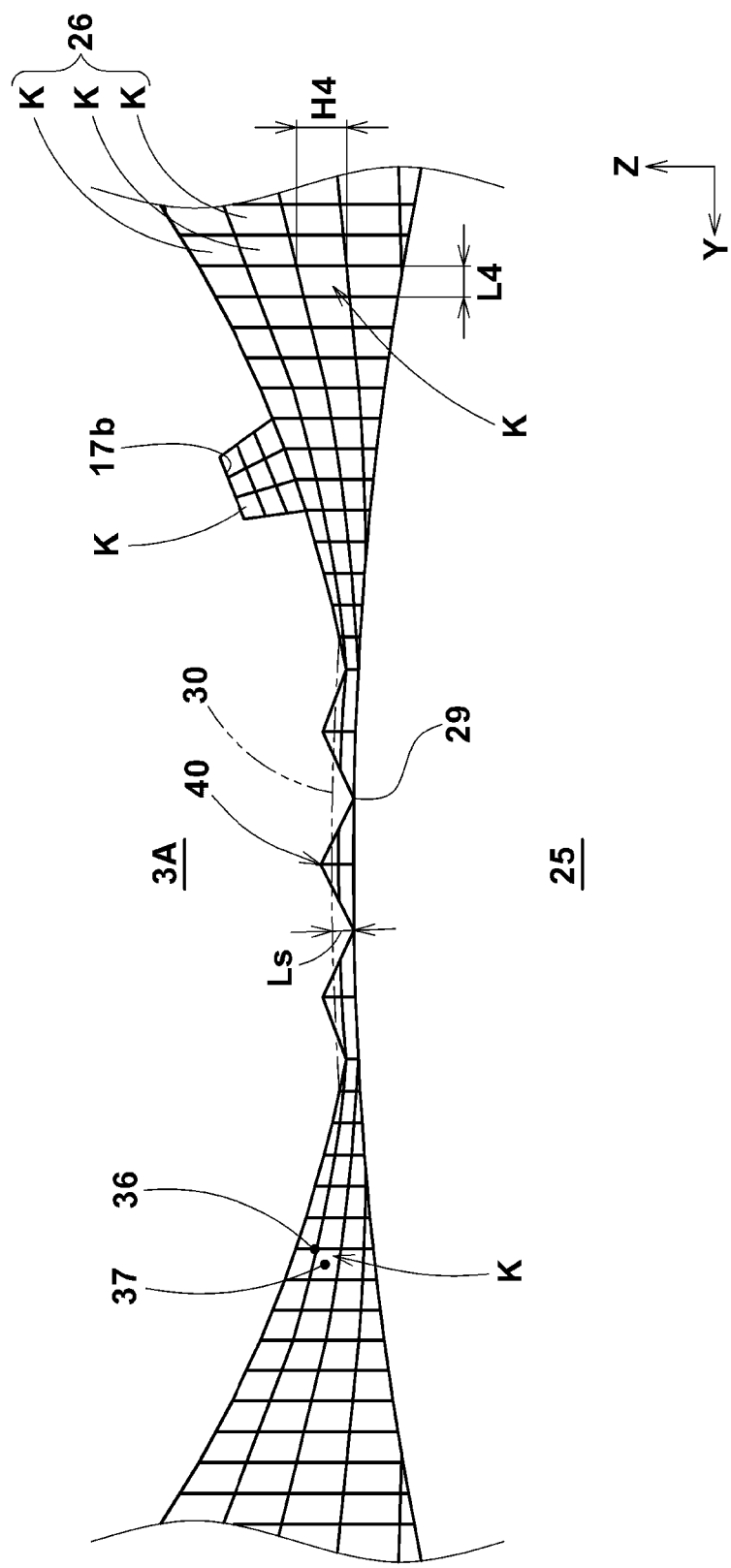
FIG. 11 is a closeup of a part of FIG. 9.

In order that physical quantities of the sound field 26 at the node points 36 (or the gravity point 37) of the each of the elements K can be computed in the after-mentioned noise simulation process S6, the sound field 26 is produced as an Euler mesh made up of three-dimensional Euler elements K as shown in FIG. 11.

The sizes of the elements K are defined so as to enable a simulation of air pressure variations corresponding to a high frequency noise. For example, the sizes H4 in the tire radial direction are set in a range of 0.1 to 2.0 mm. The size L4 of the element K in the tire circumferential direction is in a range of not more than 100 times, preferably not more than 10 times, and not less than 0.01 times, preferably not less than 0.1 times the size H4 of the element K.

**Process S54

Next, the boundary conditions of the sound field 26 are defined.

As shown in FIG. 9, the boundary is formed by: a front wall 28f on the front side of the tire model 3A; a rear wall 28r on the rear side of the tire model 3A; side walls 28s on both sides of the tire model 3A, extending between the front wall 28f and rear wall 28r; the outer surface 3t of the tire model 3A; and the outer surface of the smooth road surface model 25.

The boundary between the tire model 3A and the smooth road surface model 25 is provided with conditions of the velocity of the outer surface 3t of the tire model 3A and the velocity of the outer surface of the smooth road surface model 25.

The elements K of the sound field 26 are each provided with parameters such as initial specific gravity, viscosity, pressure and temperature of the air.

It is conceivable to perform the rolling simulation process S3 in two modes:
(1) the tire traveling through the air as real, and
(2) the tire rolling on a rotating drum (the air flow at the speed corresponding to the traveling speed is not exist).

In the case of mode (1), conditions of inflow and outflow of elements K (air) are defined on the above-mentioned front wall 28f and the rear wall 28r.

In the case of mode (2), the conditions of inflow and outflow of elements K (air) are not defined.

In either mode, on the front wall 28f, rear wall 28r and side wall 28s, conditions not to reflect a dilatational wave are defined.

When the sound field 26 is symmetrical about a plane (for example, a plane including the tire equatorial plane), symmetric boundary conditions are defined.

Instead of the conditions of inflow and outflow, namely motion of the elements K, conditions of pressure variations may be defined.

*Noise Simulation Process S6

Next, a noise simulation process S6, in which the physical quantities of the sound field 26 are computed, is performed.

Figure 12:
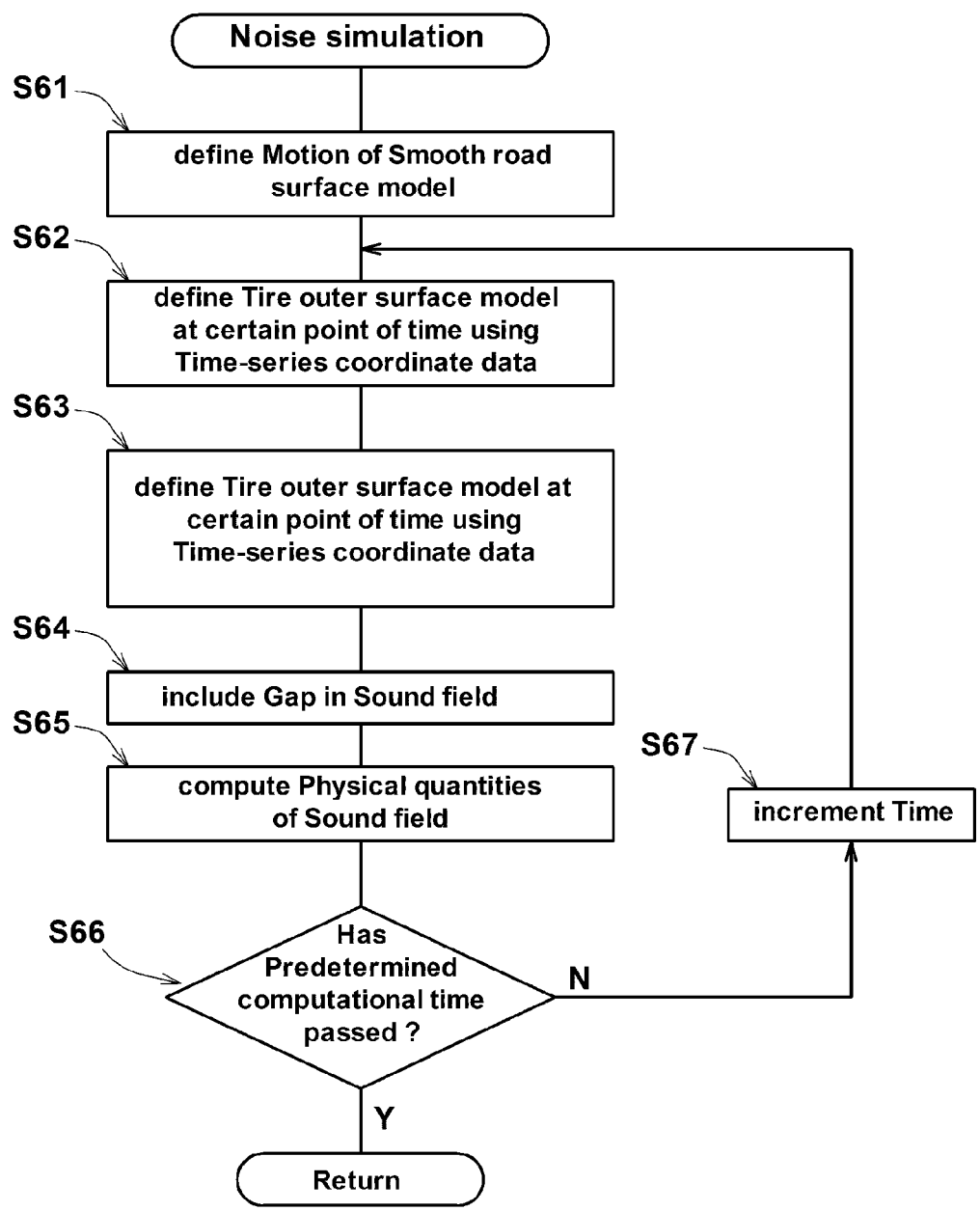
FIG. 12 is a flow chart of the noise simulation process.

FIG. 12 shows a flowchart of the noise simulation process S6.

**Process S61

In the process S6, the motion (in this embodiment, the rotation) of the smooth road surface model 25 is defined.

In this embodiment, as shown in FIG. 9, an angular velocity W2 corresponding to the traveling velocity v is defined on the rotational axis 25s of the smooth road surface model 25.

**Process S62

The computer reads out the coordinate data at a certain point of time Tx (x=0, 1, . . . ) from the above-mentioned time-series coordinate data stored in the process S35, and the outer surface 3t of the tire model 3 is defined as the tire outer surface model 3A.

**Process S63

Next, as shown in FIG. 11, at least the ground contacting part 29 of the tire outer surface model 3A is separated from the smooth road surface model 25 by small distances to form a gap 30 between the tire model 3A and the smooth road surface model 25.

The gap 30 extends continuously across the entire width and the entire circumferential length of the ground contacting part 29. In this embodiment, the minimum value of the gap 30 is limited in a range of 0.01 to 0.1 mm.

Figure 13:
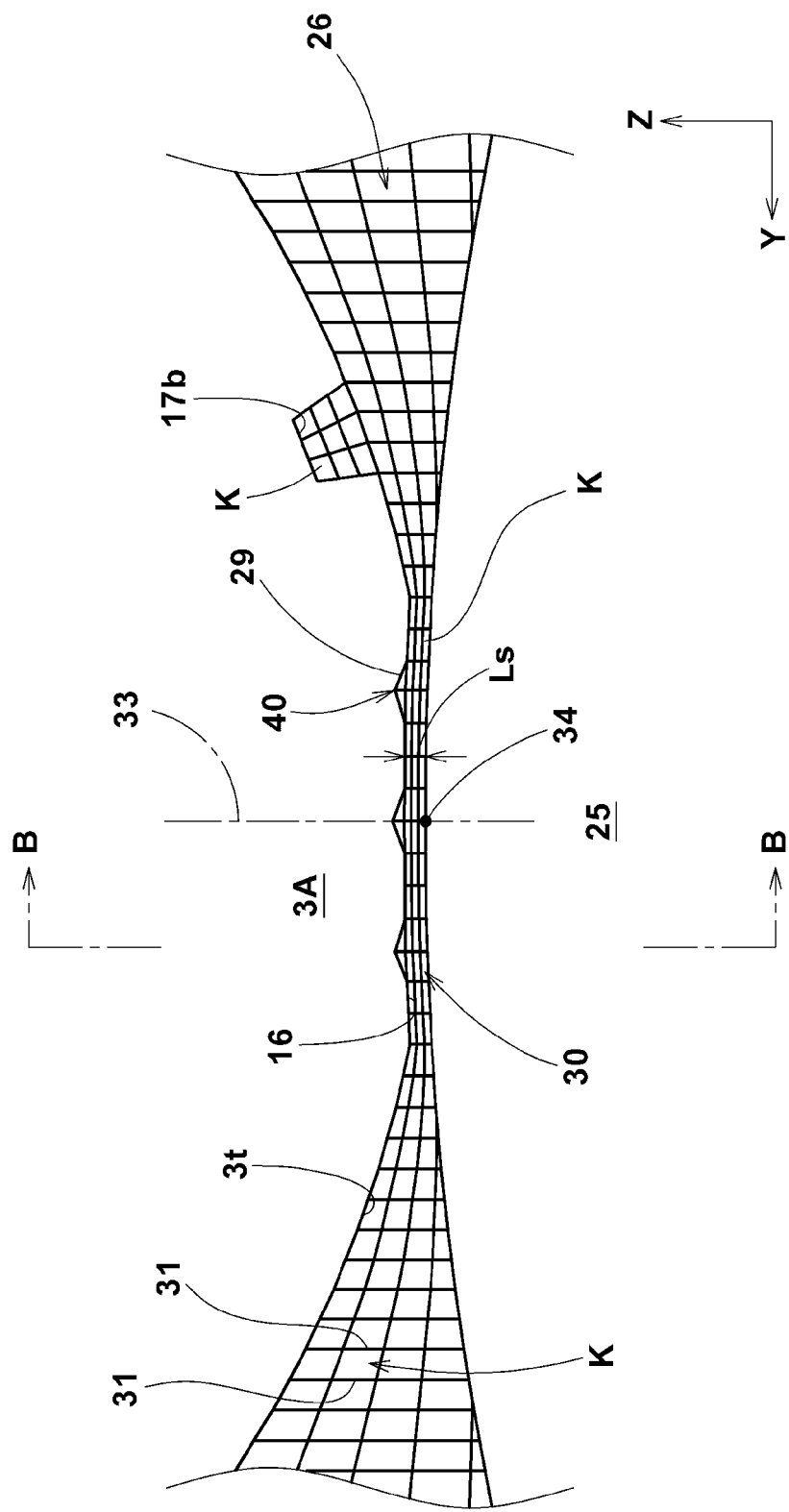
FIG. 13 is a diagram for explaining the sound field defined in the gap.
Figure 14:
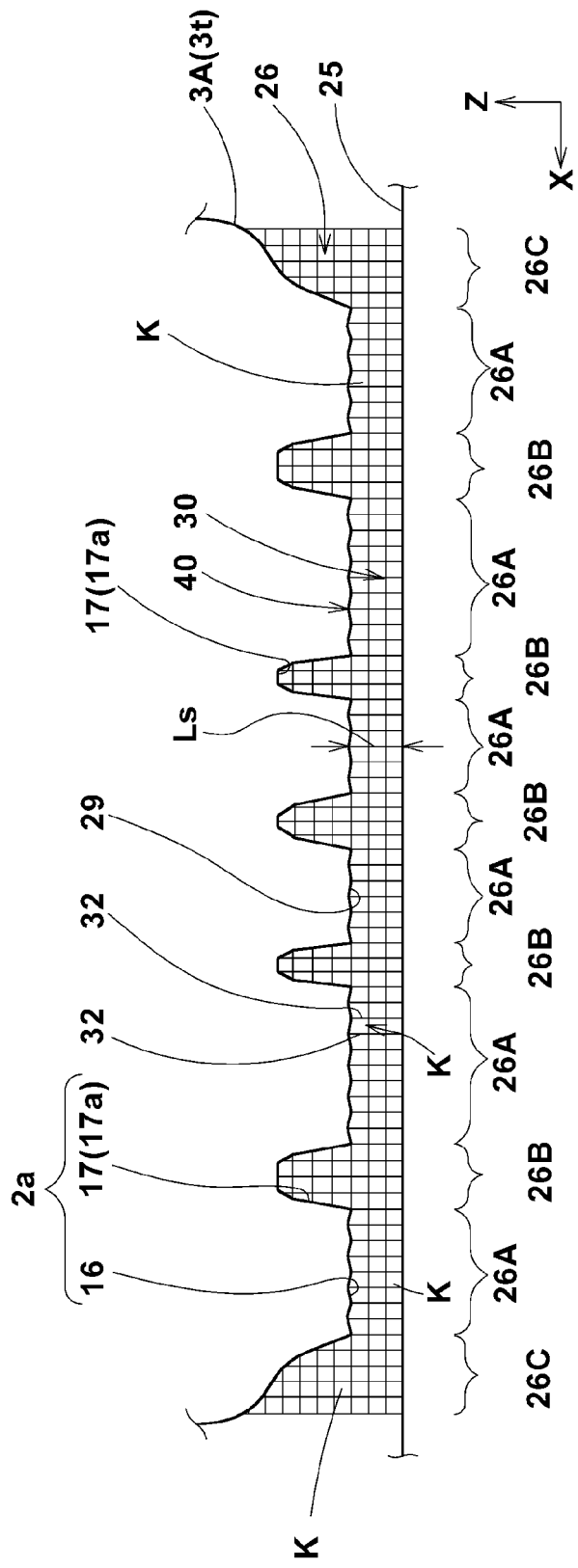
FIG. 14 is a cross sectional view taken along line B-B in FIG. 13.

As a result, as shown in FIG. 13 and FIG. 14, there appear uneven parts 40 of the tread caused by deformation due to the rough road surface model 21 during rolling.

In order to separate, the tire model 3A is partially (in the ground contacting part 29 and a part on each side thereof in the tire circumferential direction) deformed in the Z-axis direction.

Such processing can be achieved by, as shown in FIG. 11, finding out the node points of the outer surface of the tire model 3 whose distances from the surface of the smooth road surface model 25 in the Z-axis direction are less than a certain value Ls, and forcibly moving the coordinates of the found-out node points away from the smooth road surface model 25.

**Process S64

Next, the above-mentioned sound field 26 is also defined in the gap 30 as shown in FIG. 13 and FIG. 14.

The elements K of the sound field 26 existing in the gap 30 are two or more layered in the tire radial direction in order that the elements K on the tread 16 side can be computed independently from the elements K on the smooth road surface model 25 side and thereby the computational accuracy of the physical quantities of the sound field 26 can be improved. Preferably, the number of the layers is at most 10.

In the tread grooves 17a and 17b, the number of layers of the elements K count in the widthwise direction of the groove and the in the depth direction is preferably set in a range of from 2 to 10 for the similar reason.

It is preferable that each of the elements K has its side faces 31 on both sides in the tire circumferential direction which are parallel with the Z-axis direction as shown in FIG. 13, and its side faces 32 on both sides in the tire axial direction which are parallel with the tire circumferential direction and perpendicular to the smooth road surface model 25 as shown in FIG. 14 in order to minimize errors which are liable to occur during the calculation of deformation using trigonometrical functions and the calculation of migration of the physical quantities.

**\*\*Process S65**

Next, the physical quantities of the sound field 26 inclusive of the part defined in the gap are computed.

Air resonance sound generated when the air in a tread groove is resonated, air pumping noise generated when the air is jetted out through a small orifice, impact noise sound generated when the tread groove edges contact with the road surface and the like can be simulated by calculating motions or deformation of the elements K of the sound field 26.

In order to transfer the deformation or vibration of the tire outer surface model 3A to the sound field 26, from the above-mentioned time-series deformation data (vibration data) about each of the elements K of the tire model 3A, the computer reads out the deformation data at the point of time Tx.

Based on the read-out deformation data, conditions of vibrations are defined on the elements K of the sound field 26.

In this embodiment, the motion of the air is expressed by Navier-stokes equations. The Navier-stokes equations are transformed into approximate expressions, and using them, parameters representing the motion of the air such as the pressure and velocity at certain positions of the sound field 26 are computed by the computer 1.

Such calculation of the sound field 26 can be performed by the use of a fluid analysis application software available in the market such as "STAR-CD" available from CD-adapco and "FLUNET" available from ANSYS, Inc.

In this embodiment, one or more observation points are determined in advance, and the physical quantities of the air at the observation point or points are computed to estimate noise performance of the tire.

The observation points can be arbitrarily determined for example as being near the tread edge or lateral to the tire model 3A. In this embodiment, the observation point is set at a distance of 50 to 100 cm from the center 34 (FIG. 13) of the ground contacting patch of the tire, for example on a plane including the tire equatorial plane and on a normal line 33 drawn from the center 34 intersecting the tire rotational axis 3s.

**\*\*Process S66**

Next, the computer 1 judges whether or not the predetermined computational time has passed from the start point of time.

The computational time can be arbitrarily determined. In this embodiment, the computational time is the same as that in the rolling simulation process S3.

**\*\*Process S67**

If judged as being not yet passed, the time Tx is incremented by one time interval, and the above-mentioned processes S62 to S66 are again performed.

**\*\*Outputting Process S7**

If judged as having passed, the noise simulation process S6 is ended.
and physical quantities of the sound field 26 are output.

In the noise simulation process S6, therefore, without performing the rolling of motion calculation, the tire models 3A at the respective points of time Tx (x=0, 1, . . . ) are defined in sequence. Namely, it is possible to produce the rolling tire model 3A by the use the time-series coordinate data and deformation or vibration data.

As a result, it is possible to treat the rolling of the tire as the vibrations of the tire outer surface, namely, variations of the sound field in the aerodynamical simulation.

Thus, it is possible to separate the fluid calculation for the noise simulation from the motion calculation for the rolling simulation.

By the fluid calculation, variations of the physical quantities of the sound field 26 from the start to the end of the rolling can be obtained at a fixed time interval.

As shown in FIG. 14, a part 26A of the gap 30 between the tread 16 of the tire model 3A and the smooth road surface model 25 is very narrow when compared with the grooved parts 26B (grooves 17) and the part 26c outside the gap 30. Accordingly, the air pressure required for the air to entire into this narrow part 26A becomes relatively high. Therefore, such narrow part 26A functions as a barrier against the air coming from the other parts 26B and 26C.

This comes to the same thing as the tread 16 contacting with the ground (namely, there is no gap).

Accordingly, there is no need to compute the ground contacting part of the tire model 3A abutting on the gap, at regular time intervals in order to update the sound field 26, therefore, the computational time can be greatly reduced.

Further, in the noise simulation process S6, although the smooth road surface model 25 is used, the tire model 3A has the outer surface deformed by the rough road surface model 21, therefore, it is possible to take the deformed outer surface into the sound field 26.

As a result, by calculating the physical quantities of the sound field 26, it is possible to simulate noise sound generated when the tire is rolling on a rough road surface such as asphalt road surface. Thus, noise performance of the tire can be estimated.

If the rough road surface model is used instead of the smooth road surface model 25, the elements K of the sound field 26 abutting on the rough road surface model have to be deformed. But, by using the smooth road surface model 25, there is no need to deform the abutting elements K, therefore, the computational time for the physical quantities of the sound field 26 can be reduced.

In the actual tires, there is a possibility that a resonance of air in a tread groove is induced by vibrations of tread rubber and/or dilatational wave coming from the outside of the tread groove. Therefore, in the noise simulation process S6, the generation of air resonance sound may be simulated.

When the noise simulation process S6 is ended, as previously mentioned, the physical quantities of the sound field 26 are output.

For example, the air pressure variations (sound pressure) and air flow velocity at the observation point(s), and the sound pressure distribution in the sound field 26 at arbitrarily point of time may be output as the physical quantities.

*Judging Process S8

Next, it is judged whether the output physical quantities are within a predetermined acceptable range or not.

**Redesigning Process S10

If outside the acceptable range, the tire model 3 is modified, and then the simulation (namely, Process S1 to S8) is again performed.

**End Process S9

If within the acceptable range, the actual tire 2 is designed based on the tire model 3.

Accordingly, the tire having the desired noise performance can be obtained.

Comparison Tests

Figure 15:
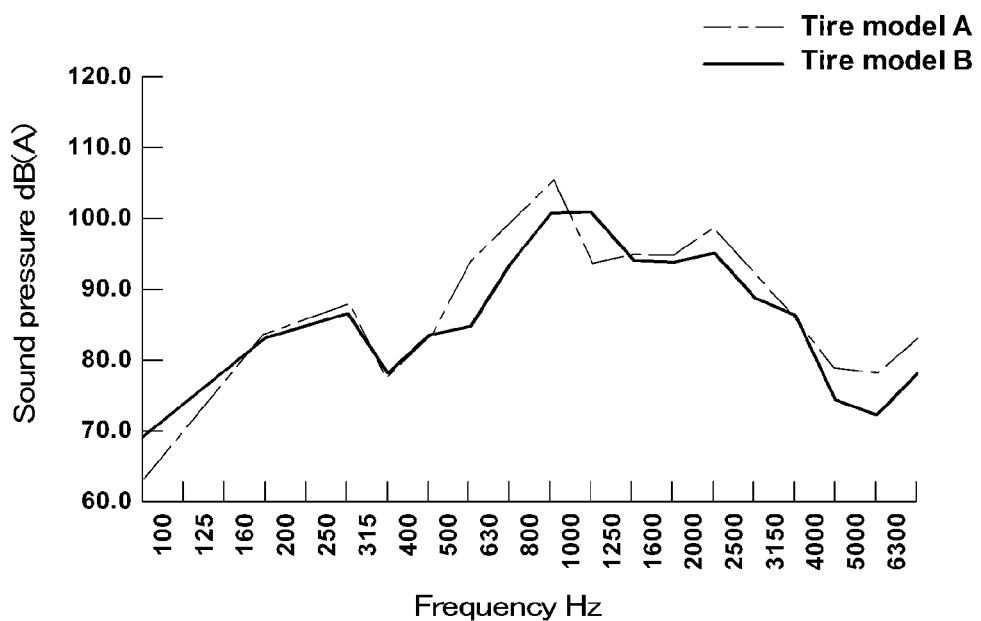
FIG. 15 shows a noise sound spectrum obtained from a method as an embodiment of the present invention.

Using two tire models (A) and (B), the simulation method as the embodiment shown in FIG. 3 was performed and the sound pressure dB(A) and frequency Hz were obtained to estimate the noises performance as shown in FIG. 15.

Figure 16:
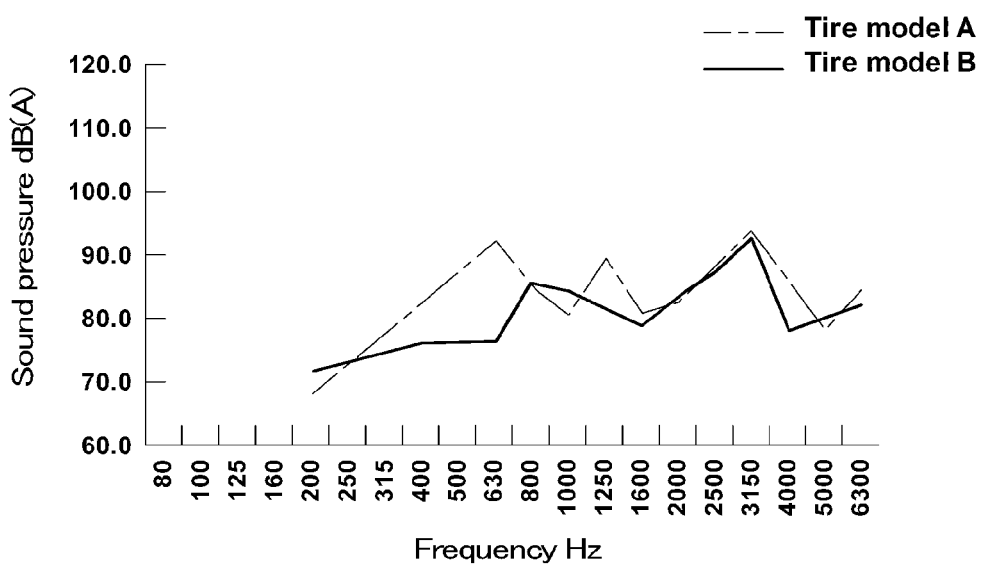
FIG. 16 shows a noise sound spectrum obtained from a method as a comparative example.

For comparison, using the tire models (A) and (B), a simulation method (comparative example 1), in which a rough road surface model was not used and a smooth road surface model was used instead, otherwise the same as the inventive method, was performed and the sound pressure dB(A) and frequency Hz were obtained to estimate the noises performance as shown in FIG. 16.

The tire model (A) had the basic structure shown in FIG. 4 and zigzag longitudinal grooves extending circumferentially of the tire. The tire model (B) had the basic structure shown in FIG. 4 and straight longitudinal grooves extending circumferentially of the tire. In each model, the tire size was 285/6 R18. The groove width W1 was 7 to 10 mm. The groove depth D1 was 10 mm.

Simulation conditions were as follows: traveling velocity v=80 km/h; computational time of rolling simulation=0.4 seconds (total time of actual phenomenon) (about four revolutions); tire load=6.25 kN; unevenness of rough road surface model in depth direction (D2)=2 mm; noise measure position=from the center point 34 shown in FIG. 13, 30 cm forward, 17 cm sideways and 3 cm upward in z-axis direction.

Using actual pneumatic tires (a) and (b) corresponding to the tire models (A) and (B), noise sound was measured during rolling on a tire test drum with a replica of a rough road surface under the following conditions: traveling speed 80 km/h; tire load 6.25 kN; tire pressure 230 kPa; wheel rim size 8.0JX18; noise measure position, same as above.

Figure 17:
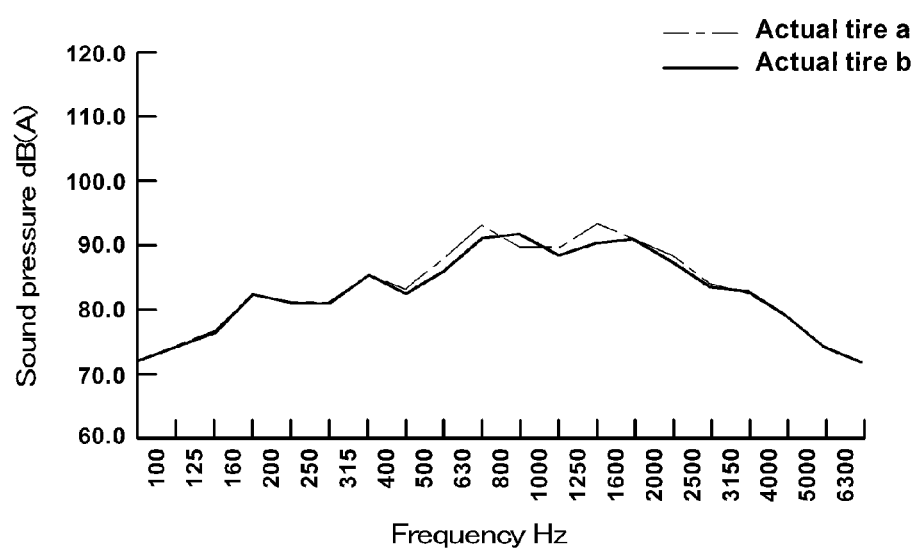
FIG. 17 shows a noise sound spectrum obtained from an actual measurement using a test drum.

The results (actual measurement 1) are shown in FIG. 17.

Further, the pneumatic tires (a) and (b) were installed on a Japanese 4700cc 4WD SUV, and during coasting on a noise test course provided with the ISO road surface at 80 km/h, noise sound was measured with a microphone set at 1.2 meter height from the road surface and 7.5 meter sideways from the running center line in the midpoint of the course.

Figure 18:
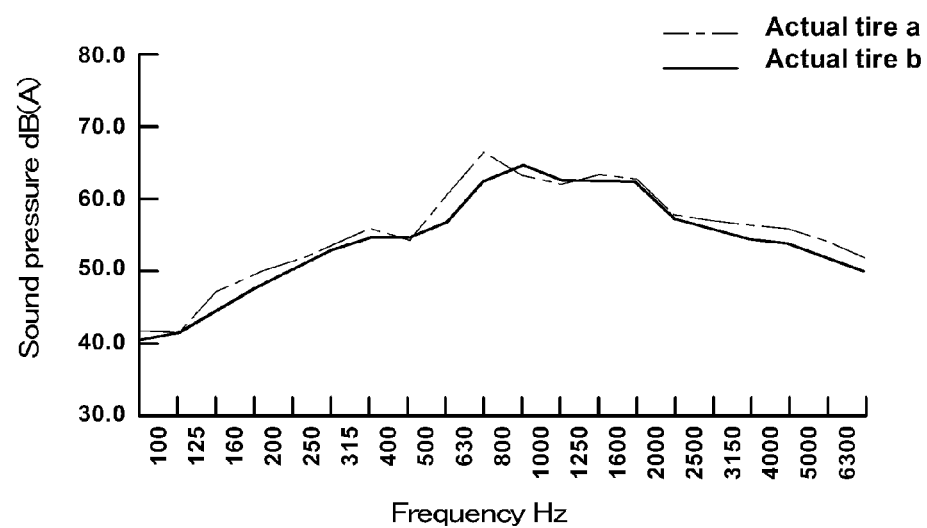
FIG. 18 shows a noise sound spectrum obtained from an actual measurement using an actual vehicle.

The results (actual measurement 2) are shown in FIG. 18.

Further, the average sound pressure level dB(A) for a frequency range from 700 to 1000 Hz corresponding to the resonance noise possibly occurring in the longitudinal grooves was computed for each of the embodiment, comparative example 1, actual measurements 1 and 2.

The results are shown in Table 1.

TABLE 1

| Method | embodiment | comparative example | actual measurement 1 | actual measurement 2 |
|---|---|---|---|---|
| tire model A/actual tire a | 105 | 85 | 94 | 67 |
| tire model B/actual tire b | 101 | 86 | 92 | 63 |

As apparent from FIGS. 15-18, when compared with the noise sound spectrum shown in FIG. 16 (comparative example), the noise sound spectrum shown in FIG. 15 (embodiment) well simulates the actual noise sound spectrums shown in FIGS. 17 and 18 (actual measurements 1 and 2).

As apparent from Table 1, according to the embodiment method, the average sound pressure level of the tire model A having the zigzag longitudinal grooves became more than that of the tire model B having the straight longitudinal grooves, whereas, according to the comparative example method, the average sound pressure level of the tire model B having the straight longitudinal grooves became more than that of the tire model A having the zigzag longitudinal grooves.

This shows that the simulation result obtained by the method according to the present invention was in consistency with the actual measurements 1 and 2 where the average sound pressure level of the actual tire (a) was more than that of the actual tire (b).

The invention claimed is:

1. A computer-implemented method for estimating noise performance of a tire during rolling, comprising:

defining a smooth road surface model in a computer, wherein the smooth road surface model is a finite element model of a smooth road surface, defining a rough road surface model in the computer, wherein the rough road surface model is a finite element model of a rough road surface, defining a tire model in the computer, wherein the tire model is a finite element model of the tire including a tread and grooves disposed in the tread, performing a rolling tire simulation by the computer by making calculations of the tire model contacting with the rough road surface model and rolling on the rough road surface model so as to obtain coordinates data on node points of the tire model appearing in the outer surface of the rolling tire model as time-series coordinates data of the outer surface of the rolling tire model deformed by contacting with the rough road surface model, defining a tire outer surface model in the computer by the time-series coordinates data obtained through the rolling tire simulation whereby the tire outer surface model is the outer surface of the tire model rolling on the rough road surface model, performing a noise simulation by the computer by setting the tire outer surface model on the smooth road surface model to simulate the tire outer surface model rolling on the smooth road surface model, and computing a physical quantity of a sound field defined in a space encompassing at least a ground contacting part of the tire outer surface model and a corresponding part of the smooth road surface model, and judging whether the computed physical quantity is within an acceptable range or not, wherein if within the acceptable range, outputting data about the tire model based on which an actual tire is designed, and if outside the acceptable range, modifying the tire model in order to repeat the performing of the rolling tire simulation, the defining of the tire outer surface model, and the performing of the noise simulation, wherein during performing the noise simulation, said ground contacting part of the tire outer surface model is always separated from the smooth road surface model by small distance so that a gap is formed between the tire outer surface model and the smooth road surface model, and said sound field is also defined in the gap, and the rough road surface model is produced by shifting node points of the smooth road surface according to data on an actual rough road surface obtained by means of three dimensional scanning.

2. The method according to claim 1, wherein the roughness of the rough road surface model is 1 to 5 mm in the depth direction, 1 to 20 mm in the rolling direction of the tire model and 1 to 20 mm in the lateral direction perpendicular to the rolling direction.

3. A computer-implemented method for estimating noise performance of a tire during rolling, comprising:

defining a smooth road surface model in a computer, wherein the smooth road surface model is a finite element model of a smooth road surface, defining a rough road surface model in the computer, wherein the rough road surface model is a finite element model of a rough road surface, defining a tire model in the computer, wherein the tire model is a finite element model of the tire including a tread and grooves disposed in the tread, performing a rolling tire simulation by the computer by making calculations of the tire model contacting with the rough road surface model and rolling on the rough road surface model so as to obtain coordinates data on node points of the tire model appearing in the outer surface of the rolling tire model as time-series coordinates data of the outer surface of the rolling tire model deformed by contacting with the rough road surface model, defining a tire outer surface model in the computer by the time-series coordinates data obtained through the rolling tire simulation whereby the tire outer surface model is the outer surface of the tire model rolling on the rough road surface model, performing a noise simulation by the computer by setting the tire outer surface model on the smooth road surface model to simulate the tire outer surface model rolling on the smooth road surface model, and computing a physical quantity of a sound field defined in a space encompassing at least a ground contacting part of the tire outer surface model and a corresponding part of the smooth road surface model, and judging whether the computed physical quantity is within an acceptable range or not, wherein if within the acceptable range, outputting data about the tire model based on which an actual tire is designed, and if outside the acceptable range, modifying the tire model in order to repeat the performing of the rolling tire simulation, the defining of the tire outer surface model, and the performing of the noise simulation, wherein the roughness of the rough road surface model is 1 to 5 mm in the depth direction, 1 to 20 mm in the rolling direction of the tire model and 1 to 20 mm in the lateral direction perpendicular to the rolling direction, and the rough road surface model is produced by shifting node points of the smooth road surface by means of random number generation.

4. The method according to claim 3, wherein during performing the noise simulation, said ground contacting part of the tire outer surface model is always separated from the smooth road surface model by small distance so that a gap is formed between the tire outer surface model and the smooth road surface model, and said sound field is also defined in the gap.

* * * * *